United States Patent
Nakano et al.

(10) Patent No.: US 11,760,821 B2
(45) Date of Patent: Sep. 19, 2023

(54) METHOD FOR PRODUCING ACRYLIC RUBBER, ACRYLIC RUBBER, ACRYLIC RUBBER COMPOSITION, VULCANIZED SUBSTANCE THEREOF, AND APPLICATION FOR VULCANIZED SUBSTANCE

(71) Applicant: DENKA COMPANY LIMITED, Tokyo (JP)

(72) Inventors: Tatsuya Nakano, Ichihara (JP); Toshiaki Miyauchi, Ichihara (JP); Takashi Kawasaki, Ichihara (JP)

(73) Assignee: Denka Company Limited, Tokyo (JP)

( * ) Notice: Subject to any disclaimer, the term of this patent is extended or adjusted under 35 U.S.C. 154(b) by 279 days.

(21) Appl. No.: 16/754,093

(22) PCT Filed: Oct. 15, 2018

(86) PCT No.: PCT/JP2018/038358
§ 371 (c)(1),
(2) Date: Apr. 6, 2020

(87) PCT Pub. No.: WO2019/078167
PCT Pub. Date: Apr. 25, 2019

(65) Prior Publication Data
US 2020/0332039 A1  Oct. 22, 2020

(30) Foreign Application Priority Data
Oct. 16, 2017 (JP) .................. 2017-200091

(51) Int. Cl.
*C08F 220/14* (2006.01)
*C08K 3/04* (2006.01)
*C08L 33/08* (2006.01)

(52) U.S. Cl.
CPC .............. *C08F 220/14* (2013.01); *C08K 3/04* (2013.01); *C08L 33/08* (2013.01); *C08L 2205/025* (2013.01)

(58) Field of Classification Search
CPC ......... C08F 220/14; C08K 3/04; C08L 33/08; C08L 2205/025
USPC ....................................... 524/424
See application file for complete search history.

(56) References Cited

U.S. PATENT DOCUMENTS 4,904,736 A    2/1990 Shimizu et al.
2015/0352747 A1  12/2015 Ikari et al.

FOREIGN PATENT DOCUMENTS

| CN | 1972996 A | 5/2007 | |
|----|-----------|--------|---|
| CN | 101218294 A | 7/2008 | |
| CN | 101679711 A | 3/2010 | |
| CN | 102124040 A | 7/2011 | |
| CN | 102959004 A | 3/2013 | |
| CN | 103328172 A | 9/2013 | |
| JP | 72003731 B  * | 9/1968 | |
| JP | S47-003731 B1 | 2/1972 | |
| JP | 2000-248139 A | 9/2000 | |
| JP | 2001-181464 A | 7/2001 | |
| JP | 2010-090351 A | 4/2010 | |
| JP | 2011-006509 A | 1/2011 | |
| JP | 2011006509 A  * | 1/2011 | |
| JP | 2011-032390 A | 2/2011 | |
| WO | WO 2007/114108 A1 | 10/2007 | |
| WO | WO-2007114108 A1 * | 10/2007 | ............ C08F 2/38 |
| WO | WO 2008/143300 A1 | 11/2008 | |
| WO | 2009/099113 A1 | 8/2009 | |

OTHER PUBLICATIONS

Japan Patent Office, International Search Report in International Application No. PCT/2018/038358 (dated Jan. 15, 2019).
Japan Patent Office, Written Opinion in International Application No. PCT/2018/038358 (dated Jan. 15, 2019).
International Bureau of WIPO, International Preliminary Report on Patentability in International Application No. PCT/2018/038358 (dated Apr. 30, 2020).
China National Intellectual Property Administration, Notice of Allowance issued in Chinese Application No. 201880066713.4 (dated May 5, 2022).
Japan Patent Office, Notice of Allowance issued in Japanese Patent Application No. 2019-549272 (dated Dec. 13, 2022).

* cited by examiner

*Primary Examiner* — Kelechi C Egwim
(74) *Attorney, Agent, or Firm* — Leydig, Voit & Mayer, Ltd.

(57) ABSTRACT

A method for producing an acrylic rubber, the method including dividedly adding 80% to 100% by mass of the total mass of a monomer component containing 100 parts by mass of an acrylic acid alkyl ester having an alkyl group having 1 to 3 carbon atoms, 20 to 160 parts by mass of an acrylic acid alkyl ester having an alkyl group having 4 to 8 carbon atoms, and 0.1 to 10 parts by mass of a crosslinking seat monomer containing a carboxyl group, and performing emulsion polymerization at a polymerization temperature of 20° C. to 60° C. The monomer component may further contain a methacrylic acid alkyl ester having an alkyl group having 1 to 4 carbon atoms, and ethylene.

12 Claims, No Drawings

METHOD FOR PRODUCING ACRYLIC RUBBER, ACRYLIC RUBBER, ACRYLIC RUBBER COMPOSITION, VULCANIZED SUBSTANCE THEREOF, AND APPLICATION FOR VULCANIZED SUBSTANCE

CROSS-REFERENCE TO RELATED APPLICATIONS

This patent application is the U.S. national phase of International Application No. PCT/JP2018/038358, filed on Oct. 15, 2018, which claims the benefit of Japanese Patent Application No. 2017-200091, filed Oct. 16, 2017, the disclosures of which are incorporated herein by reference in their entireties for all purposes.

TECHNICAL FIELD

The present invention relates to a method for producing an acrylic rubber that has excellent extrudability and exhibits excellent mechanical properties, heat resistance, and bending fatigability when converted to a vulcanizate, an acrylic rubber, an acrylic rubber composition, a vulcanizate thereof, and use applications for the vulcanizate.

BACKGROUND ART

In recent years, on the background of a rise in the demand for performance enhancement and functional enhancement, rubber component parts are also required to have high heat resistance.

Since acrylic rubbers and vulcanizates thereof have excellent physical properties such as resistance to thermal aging, oil resistance, mechanical characteristics, and permanent compression set, these materials are heavily used as materials for hose members, seal members, and the like in the automotive engine room, where heat resistance is required.

However, under the influence of the countermeasures for exhaust gases, increased power output of engines, and the like in recent years, acrylic rubbers are also required to have further enhanced heat resistance.

Regarding the means for enhancing heat resistance in acrylic rubbers, a technology for incorporating particular carbon black into an acrylic rubber composition (see, for example, Patent Literature 1) and a technology for incorporating carbon black in combination with a particular aging inhibitor (see, for example, Patent Literature 2) are known.

CITATION LIST

Patent Literature

Patent Literature 1: International Publication No. 2008/143300
Patent Literature 2: Japanese Unexamined Patent Publication No. 2011-032390

SUMMARY OF INVENTION

Technical Problem

It is a main object of the present invention to provide a method for producing an acrylic rubber that has excellent extrudability and exhibits excellent mechanical properties, heat resistance, and bending fatigability when converted to a vulcanizate; an acrylic rubber; an acrylic rubber composition; a vulcanizate thereof; and use applications for the vulcanizate.

Solution to Problem

That is, the present invention has the following gist.

(1) A method for producing an acrylic rubber, the method including dividedly adding 80% to 100% by mass of the total mass of a monomer component containing 100 parts by mass of an acrylic acid alkyl ester having an alkyl group having 1 to 3 carbon atoms, 20 to 160 parts by mass of an acrylic acid alkyl ester having an alkyl group having 4 to 8 carbon atoms, and 0.1 to 10 parts by mass of a crosslinking seat monomer containing a carboxyl group, and performing emulsion polymerization at a polymerization temperature of 20° C. to 60° C.

(2) The method for producing an acrylic rubber as described in (1), wherein the monomer component further contains 10 to 50 parts by mass of a methacrylic acid alkyl ester having an alkyl group having 1 to 4 carbon atoms.

(3) The method for producing an acrylic rubber as described in (1) or (2), wherein the monomer component further contains 0 to 10 parts by mass of ethylene.

(4) The method for producing an acrylic rubber as described in any one of (1) to (3), wherein the amount of divided addition of the monomer component per hour is 5% to 25% by mass of the total mass of the monomer component.

(5) An acrylic rubber obtainable by the production method described in any one of (1) to (4), the acrylic rubber having a die swell of 1.3 to 2.0 at a shear rate at 150° C. of 6,080 $s^{-1}$, a number average molecular weight (Mn) of 100,000 to 400,000, a molecular weight distribution (Mw/Mn) of 2 to 4, and a toluene-insoluble content of 15% or less.

(6) An acrylic rubber containing, as monomer units, 100 parts by mass of an acrylic acid alkyl ester having an alkyl group having 1 to 3 carbon atoms, 20 to 160 parts by mass of an acrylic acid alkyl ester having an alkyl group having 4 to 8 carbon atoms, and 0.1 to 10 parts by mass of a crosslinking seat monomer containing a carboxyl group, the acrylic rubber having a die swell of 1.3 to 2.0 at a shear rate at 150° C. of 6,080 $s^{-1}$, a number average molecular weight (Mn) of 100,000 to 400,000, a molecular weight distribution (Mw/Mn) of 2 to 4, and a toluene-insoluble content of 15% or less.

(7) The acrylic rubber as described in (6), further containing 10 to 50 parts by mass of a methacrylic acid alkyl ester having an alkyl group having 1 to 4 carbon atoms as a monomer unit.

(8) The acrylic rubber as described in (6) or (7), further containing 0 to 10 parts by mass of ethylene as a monomer unit.

(9) An acrylic rubber composition including 100 parts by mass of the acrylic rubber as described in any one of (6) to (8) and 30 to 80 parts by mass of carbon black.

(10) The acrylic rubber composition as described in (9), wherein the carbon black has an arithmetic mean particle size of 25 to 40 nm, a dibutyl phthalate (DBP) oil absorption of 150 to 240 ml/100 g, a ratio ($N_2SA/IA$) of the nitrogen adsorption specific surface area ($N_2SA$) and the iodine adsorption (IA) of 0.6 to 0.9, and an average stacking height in the C-axis direction (Lc) of the layer plane in a crystallite of 2 nm or more.

(11) The acrylic rubber composition as described in (9) or (10), wherein the carbon black is acetylene black.

(12) A vulcanizate of the acrylic rubber composition as described in any one of (9) to (11).

(13) The vulcanizate as described in (12), wherein the tensile force after heating for 500 hours at 190° C. is 2.0 to 7.0 MPa, and the elongation at break is 100% to 210%.

(14) The vulcanizate as described in (12) or (13), wherein in a flex cracking generation test measured according to JIS-K6260:2010, after the vulcanizate is subjected to a bending operation for 1,500,000 times, no cracks and fissures are recognized in the external appearance.

(15) A method for producing the vulcanizate as described in any one of (12) to (14), the method having a primary vulcanization step of performing steam vulcanization or press vulcanization for 1 to 10 hours at 100° C. to 200° C., and a secondary vulcanization step of subjecting the vulcanizate obtained in the primary vulcanization step to hot air vulcanization for 1 to 10 hours at 100° C. to 200° C.

(16) A rubber hose using the vulcanizate as described in any one of (12) to (14).

(17) A seal part using the vulcanizate as described in any one of (12) to (14).

Advantageous Effects of Invention

According to the present invention, a method for producing an acrylic rubber, by which an acrylic rubber having excellent extrudability and exhibits excellent mechanical properties, heat resistance, and bending fatigability when converted to a vulcanizate; a composition; a vulcanizate thereof; and use applications for the vulcanizate are provided.

DESCRIPTION OF EMBODIMENTS

Hereinafter, suitable embodiments of the present invention will be described in detail; however, the present invention is not intended to be limited to the various embodiments that will be described below.

An acrylic rubber of the present embodiment is a product obtained by dividedly adding a monomer component containing an acrylic acid alkyl ester having an alkyl group having 1 to 3 carbon atoms, an acrylic acid alkyl ester having an alkyl group having 4 to 8 carbon atoms, and a crosslinking seat monomer containing a carboxyl group, in an amount of 80% to 100% by mass in the total mass of this monomer component, and performing emulsion polymerization at a polymerization temperature of 20° C. to 60° C. A crosslinking seat monomer is a monomer having a functional group that forms a crosslinking seat (also referred to as crosslinking point). Furthermore, this acrylic rubber may also be a product obtained by further copolymerizing a methacrylic acid alkyl ester having an alkyl group having 1 to 4 carbon atoms and/or ethylene (that is, the monomer component may further contain a methacrylic acid alkyl ester having an alkyl group having 1 to 4 carbon atoms and/or ethylene).

The acrylic acid alkyl ester serves as a skeleton of the acrylic rubber, and by adjusting the contents of the acrylic acid alkyl ester having an alkyl group having 1 to 3 carbon atoms and an acrylic acid alkyl ester having an alkyl group having 4 to 8 carbon atoms, the cold resistance and oil resistance of the acrylic rubber or a vulcanizate thereof can be adjusted. For example, in a case in which an acrylic rubber is produced using ethyl acrylate and n-butyl acrylate, the oil resistance of a vulcanizate can be enhanced by increasing the copolymerization ratio of ethyl acrylate, and the cold resistance of the vulcanizate can be enhanced by increasing the copolymerization ratio of n-butyl acrylate.

Examples of the acrylic acid alkyl ester having an alkyl group having 1 to 3 carbon atoms include methyl acrylate, ethyl acrylate, and n-propyl acrylate. Examples of the acrylic acid alkyl ester having an alkyl group having 4 to 8 carbon atoms include n-butyl acrylate, isobutyl acrylate, n-pentyl acrylate, isoamyl acrylate, n-hexyl acrylate, 2-methylpentyl acrylate, n-octyl acrylate, and 2-ethylhexyl acrylate. Among these acrylic acid alkyl esters, it is preferable to use ethyl acrylate as the acrylic acid alkyl ester having an alkyl group having 1 to 3 carbon atoms, and to use n-butyl acrylate as the acrylic acid alkyl ester having an alkyl group having 4 to 8 carbon atoms.

With regard to the content of these acrylic acid alkyl esters, when the content of the acrylic acid alkyl ester having an alkyl group having 1 to 3 carbon atoms is taken as 100 parts by mass, the content of the acrylic acid alkyl ester having an alkyl group having 4 to 8 carbon atoms is in the range of 20 to 160 parts by mass, preferably 25 to 155 parts by mass, and more preferably 30 to 150 parts by mass. In a case in which the content of the acrylic acid alkyl ester having an alkyl group having 4 to 8 carbon atoms is less than 20 parts by mass, the cold resistance and bending fatigability of a vulcanizate of the resulting acrylic rubber may not be enhanced, and when the content is more than 160 parts by mass, the oil resistance and tensile strength of a vulcanizate of the resulting acrylic rubber may not be enhanced. Regarding the acrylic rubber, it is preferable that the content of a monomer unit derived from an acrylic acid alkyl ester (hereinafter, also referred to as acrylic acid alkyl ester unit) is in the above-described range. The content of these monomer units in the acrylic rubber is quantitatively determined based on a nuclear magnetic resonance spectrum obtained for the acrylic rubber or the acrylic rubber composition.

A crosslinking seat monomer is a monomer that enables intermolecular crosslinking of the resulting acrylic rubber by means of carboxyl groups derived from this crosslinking seat monomer, and is used in order to adjust the hardness and elongation at break of the acrylic rubber.

Examples of the crosslinking seat monomer include acrylic acid, methacrylic acid, crotonic acid, 2-pentenoic acid, maleic acid, fumaric acid, itaconic acid, a maleic acid monoalkyl ester, a fumaric acid monoalkyl ester, monocyclohexyl maleate, monocyclohexyl fumarate, cinnamic acid, and the like; however, the examples are not limited to these. Regarding the crosslinking seat monomer, not only single substance may be used, but also two or more kinds thereof may be used in combination.

The crosslinking seat monomer may be a maleic acid monoalkyl ester or a fumaric acid monoalkyl ester, each having 1 to 8 carbon atoms, and among these, it is preferable to use monobutyl maleate.

The content of the crosslinking seat monomer is 0.1 to 10 parts by mass, more preferably 0.5 to 10 parts by mass, even more preferably 1 to 5 parts by mass, and particularly preferably 1 to 4 parts by mass, when the content of the acrylic acid alkyl ester having an alkyl group having 1 to 3 carbon atoms is taken as 100 parts by mass. In a case in which the content of the crosslinking seat monomer is less than 0.1 part by mass, the effect of crosslinking the acrylic rubber may be low, and the strength of the resulting vulcanizate may be insufficient. In a case in which the content of the crosslinking seat monomer is more than 10 parts by mass, as the vulcanizate of the acrylic rubber is excessively hardened, this vulcanizate may lose rubber elasticity. Regarding the acrylic rubber, it is preferable that the content of a monomer unit derived from the crosslinking seat monomer (hereinafter, also referred to as crosslinking seat monomer unit) is in the above-described range. Quantitative determination of the crosslinking seat monomer unit can be carried out by dissolving crude rubber of a copolymer in toluene and performing neutralization titration using potassium hydroxide.

The acrylic rubber is obtained by introducing 20% by mass or less, and preferably 10% by mass or less, of the total mass of the above-described monomer component into a polymerization tank in advance, and performing emulsion polymerization at a polymerization temperature of 20° C. to 60° C., and preferably 30° C. to 55° C., while partitively adding (dividedly adding) 80% by mass or more, and preferably 90% by mass or more, of the remainder in the middle of polymerization. Meanwhile, in the present embodiment, it is also acceptable to dividedly add the entire amount (100% by mass) of the monomer component. In a case in which the amount of the monomer to be dividedly added is less than 80% by mass, heat removal of the heat of polymerization is not sufficiently carried out, and it is difficult to perform polymerization stably. Furthermore, the compositions of the acrylic rubber obtainable in the early stage and the later stage of polymerization are different, and the heat resistance, bending fatigability, and extrudability may become inferior.

The amount of divided addition of the monomer component per hour is preferably 5% to 25% by mass, and more preferably 10% to 20% by mass, of the total mass of the monomer component. When the amount of divided addition of the monomer component is 5% by mass or more, the molecular weight of the acrylic rubber is easily increased, and the mechanical strength is more easily enhanced. When the amount of divided addition is 25% by mass or less, heat removal of the heat of polymerization can be carried out more efficiently, and polymerization is easily carried out more stably.

Regarding the acrylic rubber, it is known that under the influence of heat, air, or the like, the main chain thereof undergoes a crosslinking reaction by oxidative deterioration, and the mechanical characteristics such as elongation at break are rapidly deteriorated. This is generally referred to as thermal aging.

In order to suppress this thermal aging, the acrylic rubber may be copolymerized with a methacrylic acid alkyl ester having an alkyl group having 1 to 4 carbon atoms. That is, the above-described monomer component may further contain a methacrylic acid alkyl ester having an alkyl group having 1 to 4 carbon atoms. The methacrylic acid alkyl ester has an effect that as the methacrylic acid alkyl ester is copolymerized into the main chain of the acrylic rubber, when the acrylic rubber composition undergoes thermal aging, hardening deterioration is suppressed, mechanical characteristics such as elongation at break are maintained, and also, the elongation at break, bending fatigability, and extrudability of the acrylic rubber are enhanced by means of the α-methyl position.

Examples of the methacrylic acid alkyl ester having 1 to 4 carbon atoms include methyl methacrylate, ethyl methacrylate, n-butyl methacrylate, and isobutyl methacrylate. Regarding the methacrylic acid alkyl ester, not only single substance may be used, but also two or more kinds thereof may be used in combination. Among these, when methyl methacrylate is used, the residual ratio of the tensile strength after thermal aging of the vulcanizate, and the residual ratio of the elongation at break can be maintained, and therefore, it is preferable.

The content of the methacrylic acid alkyl ester is preferably 10 to 50 parts by mass, and more preferably in the range of 15 to 45 parts by mass, when the content of the acrylic acid alkyl ester having an alkyl group having 1 to 3 carbon atoms is taken as 100 parts by mass. When the content is adjusted to this range, heat resistance and bending fatigability can be enhanced. When the content of the methacrylic acid alkyl ester is more than 50 parts by mass, the cold resistance of a vulcanizate of the acrylic rubber may be decreased. Regarding the acrylic rubber, it is preferable that the content of a monomer unit derived from a methacrylic acid alkyl ester (hereinafter, also referred to as methacrylic acid alkyl ester unit) is in the above-described range.

In order to enhance the mechanical characteristics of the resulting vulcanizate, the acrylic rubber may be copolymerized with ethylene. That is, the above-described monomer component may further contain ethylene. The content of ethylene is preferably 10 parts by mass or less, more preferably 0.1 to 5 parts by mass, and even more preferably 0.5 to 3 parts by mass, when the content of the acrylic acid alkyl ester having an alkyl group having 1 to 3 carbon atoms is taken as 100 parts by mass. When ethylene is copolymerized in this numerical value range, an acrylic rubber composition that gives a vulcanizate having enhanced elongation at break and bending fatigability is obtained. Regarding the acrylic rubber, it is preferable that the content of a monomer unit derived from ethylene (hereinafter, also referred to as ethylene unit) is in the above-described range. The content of the ethylene unit in the acrylic rubber is quantitatively determined based on a nuclear magnetic resonance spectrum obtained for the acrylic rubber or the acrylic rubber composition.

The acrylic rubber can also be copolymerized, to the extent that does not impair the purpose of the present invention, with another monomer that is capable of copolymerization with an acrylic acid alkyl ester, a (meth)acrylic acid alkyl ester, or a crosslinking seat monomer. The other monomer capable of copolymerization is not particularly limited; however, examples include (meth)acrylic acid alkoxy esters such as methoxyethyl acrylate; vinyl acetate; alkyl vinyl ketones such as methyl vinyl ketone; vinyl and allyl ethers such as vinyl ethyl ether and allyl methyl ether; vinyl aromatic compounds such as styrene, α-methylstyrene, chlorostyrene, vinyltoluene, and vinylnaphthalene; vinylnitriles such as acrylonitrile and methacrylonitrile; and ethylenically unsaturated compounds such as acrylamide, propylene, butadiene, isoprene, pentadiene, vinyl chloride, vinylidene chloride, vinyl fluoride, vinylidene fluoride, ethylene, vinyl propionate; maleic acid diesters such as dimethyl maleate; fumaric acid dialkyl esters such as dimethyl fumarate; itaconic acid dialkyl esters such as dimethyl itaconate; citraconic acid dialkyl esters such as dimethyl citraconate; mesaconic acid dialkyl esters such as dimethyl mesaconate; 2-pentenedioic acid dialkyl esters such as dimethyl 2-pentenedioate; and acetylene dicarboxylic acid dialkyl esters such as dimethyl acetylene dicarboxylate.

In the present embodiment, an acrylic rubber can be obtained by dividedly adding 80% to 100% by mass of the total mass of the monomer component into a reaction system for emulsion polymerization. The reaction system for emulsion polymerization may have water, an emulsifier, a pH adjusting agent, a polymerization initiator, a polymerization terminator, a chain transfer agent, and the like added thereto. These components may be added to the reaction system before the divided addition of the monomer component, or may be dividedly added to the reaction system together with the divided addition of the monomer component. The reaction system for emulsion polymerization is maintained at 20° C. to 60° C. while the monomer component is dividedly added.

The amount of addition of water in the reaction system for emulsion polymerization is, for example, preferably 80 parts by mass or more, more preferably 100 parts by mass or more, and even more preferably 120 parts by mass or more, with respect to 100 parts by mass of the total amount of the monomer component. Furthermore, the amount of addition of water in the reaction system for emulsion polymerization is, for example, preferably 500 parts by mass or less, more preferably 400 parts by mass or less, and even more preferably 300 parts by mass or less, with respect to 100 parts by mass of the total amount of the monomer component.

Examples of the emulsifier to be added to the reaction system for emulsion polymerization include nonionic emulsifiers such as a completely saponified polyvinyl alcohol, a partially saponified polyvinyl alcohol, a polyoxyethylene alkyl ether, a polyoxyethylene alkyl phenol ester, a polyoxyethylene alkyl ester, and a polyoxyethylene sorbitan alkyl ester; anionic emulsifiers such as salts of fatty acids such as myristic acid, palmitic acid, oleic acid, and linolenic acid, alkyl benzenesulfonic acid salts such as sodium dodecyl benzenesulfonate, higher alcohol sulfuric acid ester salts, and alkyl sulfosuccinic acid salts; cationic emulsifiers such as an alkyltrimethylammonium chloride, a dialkylammonium chloride, and benzylammonium chloride; copolymerizable emulsifiers such as a sulfo ester of an α,β-unsaturated carboxylic acid, a sulfate ester of an α,β-unsaturated carboxylic acid, and a sulfo alkyl aryl ether; and the like. Among these, a partially saponified polyvinyl alcohol is preferred. These emulsifiers can be used singly or in combination of two or more kinds thereof. The amount of addition of the emulsifier in the reaction system for emulsion polymerization is, for example, from 0.1 part by mass to 10 parts by mass with respect to a total amount of 100 parts by mass of the monomer component.

Examples of the pH adjusting agent to be added to the reaction system for emulsion polymerization include ammonia; alkylamines such as monomethylamine, dimethylamine, trimethylamine, monoethylamine, diethylamine, triethylamine, monoisopropylamine, diisopropylamine, triisopropylamine, monobutylamine, dibutylamine, and tributylamine; alkanolamines such as diethanolamine, diisopropanolamine, triethanolamine, dimethylethanolamine, and diethylethanolamine; alkylenepolyamines such as ethylenediamine, propylenediamine, diethylenetriamine, and triethylenetetramine; ammonia, ethyleneimine, pyrrolidine, piperidine, piperazine, morpholine; alkali metal salts such as sodium acetate, sodium hydroxide, potassium hydroxide, sodium phosphate, and sodium citrate; and the like. Among these, sodium acetate is preferred. These pH adjusting agents can be used singly or in combination of two or more kinds thereof. The amount of addition of the pH adjusting agent in the reactions system for emulsion polymerization is preferably 5 parts by mass or less, and more preferably 0.1 to 2 parts by mass, with respect to a total amount of 100 parts by mass of the monomer component.

Examples of the polymerization initiator to be added to the reaction system for emulsion polymerization include azo compounds such as azobisisobutyronitrile; organic peroxides such as tert-butyl hydroperoxide, cumene hydroperoxide, and benzoyl peroxide; inorganic peroxides such as sodium persulfate and ammonium persulfate; and the like. Among these, tert-butyl hydroperoxide is preferred. These polymerization initiators can be used singly or in combination of two or more kinds thereof. The amount of addition of the polymerization initiator in the reaction system for emulsion polymerization is, for example, 0.01 to 2 parts by mass with respect to a total amount of 100 parts by mass of the monomer component.

Furthermore, a polymerization initiator that is a peroxide (peroxide initiator) can be used, in combination with a reducing agent, as a redox-based polymerization initiator. This reducing agent is not particularly limited; however, examples include compounds containing metal ions that are in a reduced state, such as ferrous sulfate and cuprous naphthenate; sulfonic acid compounds such as sodium methanesulfonate; amine compounds such as dimethylaniline; and the like. Among these, ferrous sulfate is preferred. These reducing agents can be used singly or in combination of two or more kinds thereof. The amount of addition of the reducing agent in the reaction system for emulsion polymerization is preferably 0.01 to 2 parts by mass or less with respect to 1 part by mass of the peroxide initiator.

Examples of the polymerization terminator to be added to the reaction system for emulsion polymerization include hydroxylamine, hydroxyamine sulfuric acid salts, diethylhydroxyamine, hydroxyamine sulfonic acid and alkali metal salts thereof, sodium dimethyldithiocarbamate, hydroquinone, 1,4-benzoquinone, and the like. Among these, hydroquinone is preferred. These polymerization terminators can be used singly or in combination of two or more kinds thereof. The amount of addition of the polymerization terminator in the reaction system for emulsion polymerization is, for example, preferably from 0.1 part by mass to 2 parts by mass with respect to a total amount of 100 parts by mass of the monomer component Examples of the chain transfer agent to be added to the reaction system for emulsion polymerization include mercaptans such as n-butylmercaptan and t-dodecylmercaptan; sulfides such as tetraethylthiuram sulfide and dipentamethylenethiuram hexasulfide; an α-methylstyrene dimer, carbon tetrachloride, and the like. Among these, t-dodecylmercaptan is preferred. These chain transfer agents can be used singly or in combination of two or more kinds thereof. The amount of addition of the chain transfer agent in the reaction system for emulsion polymerization is preferably 1 part by mass or less, and more preferably 0.001 to 0.3 part by mass, with respect to a total amount of 100 parts by mass of the monomer component.

An acrylic rubber obtainable according to the method for producing an acrylic rubber of the present embodiment is such that: (1) the die swell at 150° C. at a shear rate of 6,080 $s^{-1}$ satisfies the range of 1.3 to 2.0, (2) the number average molecular weight (Mn) satisfies 100,000 to 400,000 and a molecular weight distribution (Mw/Mn) satisfies 2 to 4, and (3) the toluene-insoluble content satisfies 15% or less.

The die swell is a value representing the extrudability of the acrylic rubber, and the die swell was determined by the following formula by extruding an acrylic rubber into a strand form using Capillograph Type 1D (manufactured by TOYO SEIKI Co., Ltd.) in a room temperature environment (25° C.±2° C.) at a barrel temperature of 150° C., a barrel diameter of 9.55 mm, capillary length: L=40 mm and capillary diameter: D1=1 mm (L/D=40), and a piston descending speed of 500 mm/min (shear rate 6,080 $s^{-1}$).

$$\text{Die swell } (\%) = (W/(I\rho S_0) - 1) \times 100$$

provided that W and I represent the mass (g) and length (cm) of the sample, respectively; ρ represents the specific weight of the acrylic rubber; and $S_0$ represents the area (cm$^2$) of the die.

The value of the die swell of the acrylic rubber is in the range of 1.3 to 2.0, and more preferably in the range of 1.5 to 1.9. In order to adjust the value of the die swell, the proportion of divided addition of the monomer and the toluene-insoluble content at the time of producing the acrylic rubber, and the molecular weight distribution may be adjusted.

The number average molecular weight (Mn) of the acrylic rubber is a value that can be determined by gel permeation chromatography (GPC) and may be adjusted to the range of 100,000 to 400,000, and more preferably to the range of 150,000 to 350,000. In order to adjust the value of the number average molecular weight (Mn) of the acrylic rubber, the amount of the chain transfer agent at the time of producing the acrylic rubber may be adjusted. In a case in which the Mn of the acrylic rubber is less than 100,000, the tensile strength may be decreased, and in a case in which the Mn is larger than 400,000, handling may be difficult.

The molecular weight distribution (Mw/Mn) of the acrylic rubber is the ratio between the weight average molecular weight and the number average molecular weight, which can be determined by gel permeation chromatography (GPC), and the molecular weight distribution may be adjusted to the range of 2 to 4, and more preferably to the range of 2.5 to 3.5. In order to adjust the molecular weight distribution (Mw/Mn) of the acrylic rubber, the polymerization temperature at the time of producing the acrylic rubber may be adjusted. In a case in which the molecular weight distribution (Mw/Mn) is smaller than 2, extrudability and bending fatigability may be decreased, and in a case in which the molecular weight distribution is larger than 4, the tensile strength may be decreased. The molecular weight and the molecular weight distribution made by GPC measurement can be determined using a polystyrene gel column with tetrahydrofuran as a mobile phase, and performing calculation relative to polystyrene standards.

The toluene-insoluble content of the acrylic rubber may be adjusted to the range of 15% or less, and more preferably to the range of 10% or less. In order to adjust the toluene-insoluble content of the acrylic rubber, the final polymerization ratio or the polymerization temperature at the time of producing the acrylic rubber may be adjusted. In a case in which the toluene-insoluble content is larger than 15%, the tensile strength, bending fatigability, extrudability, and heat resistance may be decreased. The adjustment of the toluene-insoluble content can be carried out by adjustment of the polymerization temperature and the type of the emulsifier or the solidifier.

The toluene-insoluble content can be calculated as follows.

1 g (a) of a sample is precisely weighed and dissolved in 100 ml of toluene at a temperature of 25° C. for 48 hours, subsequently the dissolved liquid is transferred into a centrifuge tube having a capacity of 250 ml, the mass (b) of which has been measured in advance, the dissolved liquid is centrifuged using an angle rotor having a maximum centrifugal radius of 13.8 cm at a temperature of 10° C. or lower and at 8,500 rpm for 60 minutes, a non-sediment is removed by decantation, the residue is dried for 24 hours in a vacuum dryer at a temperature of 70° C., the mass (d) of the centrifuge tube after drying is measured, and the toluene-insoluble content is calculated by the following formula.

Toluene-insoluble content (%)=$(d-b)/a \times 100$

When carbon black is incorporated into the acrylic rubber, the mechanical properties and heat resistance of a vulcanizate obtainable therefrom can be enhanced. Examples of the carbon black include acetylene black, Ketjen black, thermal black, channel black, furnace black, lamp black, graphitized carbon black, and the like; however, the examples are not limited to these. According to the present embodiment, in order to further provide the effects of the present invention, it is particularly preferable to use acetylene black among these carbon blacks.

The content of the carbon black in the acrylic rubber composition is 30 to 80 parts by mass, more preferably 40 to 75 parts by mass, and even more preferably 45 to 70 parts by mass, with respect to 100 parts by mass of the acrylic rubber. When the content of the carbon black is less than 30 parts by mass, an effect of enhancing the strength of the vulcanizate may not be exhibited. In a case in which the content is more than 90 parts by mass, the tensile strength of the vulcanizate may be decreased.

The arithmetic mean particle size of the carbon black is preferably in the range of 25 to 45 nm, and more preferably 30 to 40 nm. This arithmetic mean particle size is an average value of the maximum diameters of any arbitrary thirty particles. This maximum diameter is checked by an electron microscope. In a case in which the arithmetic mean particle size is less than 25 nm, the resulting acrylic rubber composition loses fluidity, and extrudability may be inferior. Furthermore, in a case in which the arithmetic mean particle size is more than 45 nm, the reinforcing property of the acrylic rubber is low, and the mechanical strength may be decreased.

The DBP oil absorption of the carbon black is, for example, 150 to 240 ml/100 g, and preferably 155 to 225 ml/100 g. In a case in which the DBP oil absorption is less than 150 ml/100 g, the dispersibility of the carbon black may be inferior, and heat resistance may be decreased. Furthermore, in a case in which the DBP oil absorption is larger than 220 ml/100 g, the particle hardness of the carbon black is decreased, a fine powder is likely to be formed, and handling may be difficult.

The ratio ($N_2SA/IA$) of the nitrogen adsorption specific surface area ($N_2SA$) of the carbon black and the iodine adsorption (IA) is 0.6 to 0.9 and is particularly preferably 0.7 to 0.8. In a case in which the $N_2SA/IA$ representing the surface activity of the carbon black is less than 0.6, the reinforcing property is inferior, and the mechanical strength may be decreased. Furthermore, in a case in which the ratio is more than 0.9, processability, bending fatigability, and extrudability may be inferior.

The average stacking height Lc in the C-axis direction of the layer plane in a crystallite of the carbon black is, for example, 2 nm or more, and is particularly preferably 2.5 nm or more. In a case in which Lc is less than 2 nm, the reinforcing property of the rubber composition is low, and the mechanical strength may be decreased.

The acrylic rubber composition may further contain a vulcanizing agent or a vulcanization accelerator.

The vulcanizing agent is not particularly limited as long as the agent is conventionally used for the vulcanization of a carboxyl group-containing acrylic rubber composition, and a polyvalent amine compound and a carbonic acid salt of a polyvalent amine compound are preferred, while a polyvalent amine compound having 4 to 30 carbon atoms and a carbonic acid salt thereof are more preferred. Meanwhile, regarding these vulcanizing agents, not only single substance may be used, but also two or more kinds thereof may be used in combination. Not only single substance may be used, but also two or more kinds thereof may be used in combination.

The polyvalent amine compound and a carbonic acid salt of the polyvalent amine compound are not particularly limited; however, examples include an aliphatic polyvalent amine compound and a carbonic acid salt thereof, an aromatic polyvalent amine compound, and the like. Among these, an aliphatic polyvalent amine compound and a carbonic acid salt thereof are particularly preferred.

The aliphatic polyvalent amine compound and a carbonic acid salt thereof are not particularly limited; however, examples include hexamethylenediamine, hexamethylenediamine carbamate, N,N-dicinnamylidene-1,6-hexanediamine, and the like. Among these, hexamethylenediamine carbamate is preferred.

The aromatic polyvalent amine compound is not particularly limited; however, for example, 4,4'-methylenedianiline, p-phenylenediamine, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylenediamine, p-xylylenediamine, 1,3,5-benzenetriamine, and the like. Among these, 2,2'-bis[4-(4-aminophenoxy)phenyl]propane is preferred.

The content of the vulcanizing agent is not particularly limited; however, the content is preferably 0.1 to 10 parts by mass, and more preferably 0.3 to 5 parts by mass, with respect to 100 parts by mass of the acrylic rubber. When the content is adjusted to this range, a necessary and sufficient vulcanization treatment is carried out.

Furthermore, it is preferable that the vulcanizing agent further contains a vulcanization accelerator. The vulcanization accelerator is added in order to adjust the vulcanization rate. The vulcanization accelerator is not particularly limited; however, an aliphatic monovalent secondary amine compound, an aliphatic monovalent tertiary amine compound, a guanidine compound, an imidazole compound, a quaternary onium salt, a tertiary phosphine compound, a weakly acidic alkali metal salt, a diazabicycloalkene compound, and the like are preferably used, and among these, a diazabicycloalkene compound is preferred.

The amount of addition of the vulcanization accelerator may be added to the extent that the characteristics of the vulcanizate obtainable from the acrylic rubber composition according to the present embodiment are not deteriorated.

An aliphatic monovalent secondary amine compound is a compound in which two hydrogen atoms of ammonia have been substituted with aliphatic hydrocarbon groups. The aliphatic hydrocarbon group that substitutes for a hydrogen atom is not particularly limited; however, the aliphatic hydrocarbon group is preferably a group having 1 to 30 carbon atoms, and more preferably a group having 8 to 20 carbon atoms. Specific examples of the aliphatic monovalent secondary amine compound include dimethylamine, diethylamine, di-n-propylamine, diallylamine, diisopropylamine, di-n-butylamine, di-t-butylamine, di-sec-butylamine, dipentylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, di-cis-9-octadecenylamine, dinonadecylamine, and the like.

An aliphatic monovalent tertiary amine compound is a compound in which all of the three hydrogen atoms of ammonia have been substituted with aliphatic hydrocarbon groups. The aliphatic hydrocarbon group that substitutes for a hydrogen atom is not particularly limited; however, the aliphatic hydrocarbon group is preferably a group having 1 to 30 carbon atoms, and more preferably a group having 1 to 22 carbon atoms. Specific examples of the aliphatic monovalent tertiary amine compound include trimethylamine, triethylamine, tri-n-propylamine, triallylamine, triisopropylamine, tri-n-butylamine, tri-t-butylamine, tri-sec-butylamine, tripentylamine, trihexylamine, triheptylamine, trioctylamine, ttinonylamine, tridecylamine, triundecylamine, tridodecylamine, tridecylamine, tritetradecylamine, tripentadecylamine, tricetylamine, tri-2-ethylhexylamine, trioctadecylamine, tri-cis-9-octadecenylamine, trinonadecylamine, N,N-dimethyldecylamine, N,N-dimethyldodecylamine, N,N-dimethyltetradecylamine, N,N-dimethylcetylamine, N,N-dimethyloctadecyl amine, N,N-dimethylbehenylamine, N-methyldidecylamine, N-methyldidodecylamine, N-methylditetradecylamine, N-methyldicetylamine, N-methyldioctadecylamine, N-methyldibehenylamine, dimethylcyclohexylamine, and the like.

Specific examples of the guanidine compound include 1,3-di-o-tolylguanidine, 1,3-diphenylguanidine compound, and the like.

Specific examples of the imidazole compound include 2-methylimidazole, 2-phenylimidazole, and the like.

Specific examples of the quaternary onium salt include tetra-n-butylammonium bromide, octadecyl tri-n-butylammonium bromide, and the like.

Specific examples of the tertiary phosphine compound include triphenylphosphine, tri-p-tolylphosphine, and the like.

Specific examples of the weakly acidic alkali metal salt include inorganic weak acid salts such as phosphates and carbonates of sodium and potassium; and organic weak acid salts such as stearates and laurates of sodium and potassium.

Specific examples of the diazabicycloalkene compound include 1,8-diazabicyclo[5.4.0]undec-7-ene (DBU), 1,5-diazabicyclo[4.3.0]non-5-ene (DBN), and the like.

The above-described vulcanizing agents, vulcanization accelerators, and the like are kneaded with the acrylic rubber composition of the present embodiment at a temperature lower than or equal to the vulcanization temperature. The acrylic rubber composition of the present embodiment may be formed into various desired shapes and then vulcanized to obtain a vulcanizate, or may be vulcanized and then formed into various shapes. The vulcanization temperature can be appropriately set depending on the contents of the various components in the acrylic rubber composition or the type of the vulcanizing agent, and the vulcanization temperature is usually 100° C. to 200° C., and preferably 130° C. to 180° C. Furthermore, the time required for vulcanization is 1 to 10 hours, and preferably 2 to 6 hours.

Regarding the apparatus for kneading, forming, and vulcanizing the acrylic rubber composition and the apparatus for kneading and for ring a vulcanizate of the acrylic rubber composition, those that are conventionally used in rubber industry can be used. Regarding the vulcanization method, steam vulcanization or press vulcanization is preferred.

Furthermore, the acrylic rubber composition is subjected to secondary vulcanization by hot air vulcanization as necessary. The vulcanization temperature can be appropriately set depending on the contents of the various components in the acrylic rubber composition or the type of the vulcanizing agent, and the vulcanization temperature is usually 100° C. to 200° C., and preferably 130° C. to 180° C. Furthermore, the time required for vulcanization is 1 to 10 hours, and preferably 2 to 6 hours. Sufficient mechanical characteristics and rubber elasticity may be obtained by performing secondary vulcanization.

The acrylic rubber composition may have a filler, a reinforcing agent, a plasticizer, a lubricating agent, an aging inhibitor, a stabilizer, a silane coupling agent, and the like added thereto depending on the purpose, on the occasion of being supplied for practical use.

Regarding the filler and the reinforcing agent, any filler and reinforcing agent that are used for conventional use applications of rubber in addition to carbon black can be added, and for example, there are fillers and reinforcing agents such as silica, talc, and calcium carbonate. The content of these additives is preferably in the range of 20 to 100 parts by mass with respect to 100 parts by mass of the acrylic rubber composition in total.

Regarding the plasticizer, any plasticizer that is used for conventional use applications of rubber can be added, and for example, there are ester-based plasticizer, polyoxyethylene ether-based plasticizers, trimellitate-based plasticizers, and the like. The content of the plasticizer is preferably in the range of up to about 50 parts by mass with respect to 100 parts by mass of the acrylic rubber composition.

The vulcanizate of the present embodiment has a tensile strength after being heated to 500 hours at 190° C. of 2.0 to 7.0 MPa, and an elongation at break of 100% to 210%. In order to adjust the tensile strength after heating to this range, a carbon black having a high Lc value may be used, and in order to adjust the elongation at break after heating to this range, a carbon black having a low $N_2SA/IA$ value may be used.

The vulcanizate of the present embodiment is such that in a flex cracking generation test measured according to JIS-K6260:2010, after the vulcanizate is subjected to a bending operation for 1,500,000 times, no cracks and fissures are recognized in the external appearance. In order to prevent the generation of cracks and fissures in the external appearance, the toluene-insoluble content, the amount of crosslinking seats, and the polymerization temperature may be adjusted.

The vulcanizate of the acrylic rubber composition of the present embodiment is suitably used particularly as a rubber hose or a seal part such as a gasket or a packing. These rubber hose and seal part may be formed from the acrylic rubber composition of the present embodiment only or a vulcanizate thereof only, or may be used in combination with other parts.

Examples of the rubber hose include transmission oil cooler hoses for automobiles, construction machines, hydraulic pressure equipment, and the like; engine oil cooler hoses, air duct hoses, turbo intercooler hoses, hot air hoses, radiator hoses, power steering hoses, hoses for fuel systems, hoses for drain systems, and the like.

Regarding the configuration of the rubber hose, a rubber hose provided with reinforcing yarns wires in the middle of the hose or in the outermost layer of the rubber hose as generally being practiced, or a hose having a laminated structure with a rubber such as a fluororubber or a silicone rubber, may also be used.

Examples of the seal part include an engine head cover gasket, an oil pan gasket, an oil seal, a lip seal packing, an O-ring, a transmission seal gasket, a crank shaft, a camshaft seal gasket, a valve stem, a power steering seal belt cover seal, a boot material for constant velocity joint, a rack and pinion boot material, and the like.

EXAMPLES

Hereinafter, the present invention will be described in more detail by way of Examples; however, the present invention is not intended to be limited by these Examples.

The reagents used for tests are as follows.
Acetylene black granular product: DENKA BLACK granular product manufactured by Denka Co., Ltd.
Acetylene black FX-35: DENKA BLACK FX-35 manufactured by Denka Co., Ltd.
Acetylene black HS-100: DENKA BLACK HS-100 manufactured by Denka Co., Ltd.
FEF carbon black: SEAST SO manufactured by Tokai Carbon Co., Ltd.
Stearic acid: LUNAC S-90 manufactured by Kao Corp.
Aging inhibitor: NAUGARD 445 (4,4'-bis(α,α-dimethylbenzyl)diphenylamine) manufactured by Uniroyal, Inc.
Liquid paraffin: HECOL K-230 manufactured by Kaneda Co., Ltd.
Stearylamine: FARMIN 80 manufactured by Kao Corp.
Diak #1: Vulcanizing agent 6-aminohexylcarbamic acid manufactured by DuPont, Inc.
XLA-60: Vulcanization accelerator manufactured by Lanxess AG The physical properties of the three kinds of acetylene black and FEF carbon black were measured as follows, and the measurement results are presented in Table 1.

(1) Arithmetic Mean Particle Size
An average value obtained by capturing an image of a carbon black powder by transmission electron microscopy at a magnification ratio of 50,000 times, and measuring thirty particle sizes.
(2) DBP Oil Absorption
Measured according to JIS K 6217-4:2008.
(3) Nitrogen Adsorption Specific Surface Area ($N_2SA$)
Measured according to JIS K 6217-2:2008.
(4) Iodine Adsorption (IA)
Measured according to JIS K 6217-1:2008.
(5) Average Stacking Height in C-Axis Direction of Layer Plane in Crystallite (Lc)
Calculated by the following formula based on the (002) diffraction lines obtained by an X-ray diffraction method using the Cu-Kα line.

$$Lc=(180 \cdot K \cdot \lambda)/(\pi \cdot \beta \cdot \cos\theta)$$

provided that K=shape factor (using 0.9), λ=wavelength of X-ray (0.154 nm), θ=angle showing the maximum value in the (002) diffraction line absorption band, β=half-peak width in the (002) diffraction line absorption band, represented as an angle.
(6) Apparent Density
Measured according to JIS K 6219-2:2006.
(7) Heating Loss
Measured according to JIS K 6218-1:2005.
(8) Ash Content
Measured according to JIS K 6218-2:2005.

TABLE 1

|  |  | Acetylene black | | | FEF carbon black |
| --- | --- | --- | --- | --- | --- |
|  |  | Granular product | FX-35 | HS-100 | |
| Arithmetic mean particle size | nm | 36 | 26 | 48 | 43 |
| DBP oil absorption | ml/100 g | 160 | 220 | 140 | 115 |
| Nitrogen adsorption specific surface area ($N_2SA$) | m²/g | 69 | 133 | 39 | 42 |
| Iodine adsorption (IA) | mg/g | 93 | 180 | 52 | 44 |
| Ratio ($N_2SA/IA$) | mg/m² | 0.74 | 0.74 | 0.74 | 0.95 |
| Average stacking height in C-axis direction of layer plane in crystallite (Lc) | nm | 3.5 | 2.5 | 2.9 | 1.8 |

TABLE 1-continued

|  |  | Acetylene black | | | FEF |
| --- | --- | --- | --- | --- | --- |
|  |  | Granular product | FX-35 | HS-100 | carbon black |
| Apparent density | g/ml | 0.25 | 0.05 | 0.15 | 0.38 |
| Heating loss | % | 0.03 | 0.08 | 0.04 | 0.3 |
| Ash content | % | 0.01 | 0.01 | 0.01 | 0.2 |

Acrylic rubbers were produced under the conditions described below.

<Acrylic Rubber A>

Into a pressure-resistant reaction vessel having an internal volume of 40 liters, 17 kg of a 4 mass % aqueous solution of a partially saponified polyvinyl alcohol and 22 g of sodium acetate were introduced, and while the mixture was thoroughly mixed with a stirrer, the air in the upper part inside the vessel was purged with nitrogen. Subsequently, 0.95 kg of ethylene was injected into the upper part of the vessel, and the pressure was adjusted to 3.5 MPa. Stirring was rapidly carried out, the inside of the vessel was maintained at 55° C., and then a monomer mixed liquid of 6.2 kg of ethyl acrylate, 3.9 kg of n-butyl acrylate, 1.1 kg of methyl methacrylate, 300 g of monobutyl maleate, and 1.8 g of tert-dodecylmercaptan was injected in for 6 hours. Simultaneously, an aqueous solution of t-butyl hydroperoxide (0.25% by mass, 2 liters) was injected in through a separate inlet port for 6 hours, and polymerization was carried out until a final polymerization ratio of 95% was reached. To the polymerization liquid thus produced, an aqueous solution of sodium borate (3.5% by mass, 7 liters) was added as a solidifying agent, a polymer was solidified and was subjected to dehydration and drying, and thus acrylic rubber A was obtained.

The copolymer composition of this acrylic rubber A was 2.0% by mass of an ethylene monomer unit, 1.6% by mass of a monobutyl maleate monomer unit, 53.0% by mass of an ethyl acrylate monomer unit, 33.7% by mass of a n-butyl acrylate monomer unit, and 9.7% by mass of a methyl methacrylate monomer unit. Regarding the quantitative determination of the monobutyl maleate monomer unit, crude rubber of the copolymer was dissolved in toluene, and measurement was made by neutralization titration using potassium hydroxide. For other copolymer compositions, nuclear magnetic resonance spectra were collected, and various components were quantitatively determined. Furthermore, the number average molecular weight Mn was 350,000, and the molecular weight distribution Mw/Mn was 3.7.

<Acrylic Rubber B>

Acrylic rubber B was obtained at a final polymerization ratio of 95% by a method similar to that for acrylic rubber A, except that the amount of tert-dodecylmercaptan was changed to 12.4 g.

The copolymer composition of this acrylic rubber B was 2.0% by mass of an ethylene monomer unit, 1.6% by mass of a monobutyl maleate monomer unit, 52.8% by mass of an ethyl acrylate monomer unit, 33.8% by mass of an n-butyl acrylate monomer unit, and 9.8% by mass of a methyl methacrylate monomer unit. Furthermore, the number average molecular weight Mn was 120,000, and the molecular weight distribution Mw/Mn was 3.9.

<Acrylic Rubber C>

Acrylic rubber C was obtained at a final polymerization ratio of 95% by a method similar to that for acrylic rubber A, except that polymerization was performed at normal pressure without using ethylene.

The copolymer composition of this acrylic rubber C was 1.6% by mass of a monobutyl maleate monomer unit, 53.9% by mass of an ethyl acrylate monomer unit, 34.5% by mass of an n-butyl acrylate monomer unit, and 10% by mass of a methyl methacrylate monomer unit. Furthermore, the number average molecular weight Mn was 330,000, and the molecular weight distribution Mw/Mn was 3.8.

<Acrylic Rubber D>

Acrylic rubber D was obtained at a final polymerization ratio of 95% by a method similar to that for acrylic rubber A, except that the polymerization temperature was changed to 30° C.

The copolymer composition of this acrylic rubber D was 3.6% by mass of an ethylene monomer unit, 1.7% by mass of a monobutyl maleate monomer unit, 52.2% by mass of an ethyl acrylate monomer unit, 33.1% by mass of an n-butyl acrylate monomer unit, and 9.4% by mass of a methyl methacrylate monomer unit. Furthermore, the number average molecular weight Mn was 340,000, and the molecular weight distribution Mw/Mn was 3.7.

<Acrylic Rubber E>

Acrylic rubber E was obtained at a final polymerization ratio of 95% by a method similar to that for acrylic rubber A, except that the amounts were changed to 3.9 kg of ethyl acrylate, 5.6 kg of n-butyl acrylate, 1.7 kg of methyl methacrylate, 300 g of monobutyl maleate, and 1.1 g of tert-dodecylmercaptan.

The copolymer composition of this acrylic rubber E was 2.1% by mass of an ethylene monomer unit, 1.6% by mass of a monobutyl maleate monomer unit, 33.1% by mass of an ethyl acrylate monomer unit, 48.7% by mass of an n-butyl acrylate monomer unit, and 14.5% by mass of a methyl methacrylate monomer unit. Furthermore, the number average molecular weight Mn was 330,000, and the molecular weight distribution Mw/Mn was 3.6.

<Acrylic Rubber F>

Acrylic rubber F was obtained at a final polymerization ratio of 95% by a method similar to that for acrylic rubber A, except that the amounts were changed to 7.8 kg of ethyl acrylate, 3.4 kg of n-butyl acrylate, 300 g of monobutyl maleate, and 1.4 g of tert-dodecylmercaptan.

The copolymer composition of this acrylic rubber F was 1.9% by mass of an ethylene monomer unit, 1.7% by mass of a monobutyl maleate monomer unit, 67.5% by mass of an ethyl acrylate monomer unit, and 28.9% by mass of an n-butyl acrylate monomer unit. Furthermore, the number average molecular weight Mn was 210,000, and the molecular weight distribution Mw/Mn was 3.7.

<Acrylic Rubber G>

Acrylic rubber G was obtained at a final polymerization ratio of 95% by a method similar to that for acrylic rubber A, except that polymerization was initiated in a state in which the monomer mixed liquid had all been introduced into the reaction vessel in advance.

The copolymer composition of this acrylic rubber G was 1.7% by mass of an ethylene monomer unit, 1.5% by mass of a monobutyl maleate monomer unit, 52.9% by mass of an ethyl acrylate monomer unit, 34.1% by mass of an n-butyl acrylate monomer unit, and 9.8% by mass of a methyl methacrylate monomer unit. Furthermore, the number average molecular weight Mn was 360,000, and the molecular weight distribution Mw/Mn was 4.2.

<Acrylic Rubber H>

Acrylic rubber H was obtained at a final polymerization ratio of 95% by a method similar to that for acrylic rubber F, except that polymerization was initiated in a state in which the monomer mixed liquid had all been introduced into the reactor vessel in advance.

The copolymer composition of this acrylic rubber H was 1.7% by mass of an ethylene monomer unit, 1.6% by mass of a monobutyl maleate monomer unit, 67.6% by mass of an ethyl acrylate monomer unit, and 29.1% by mass of an n-butyl acrylate monomer unit. Furthermore, the number average molecular weight Mn was 200,000, and the molecular weight distribution Mw/Mn was 4.3.

<Acrylic Rubber I>

Acrylic rubber I was obtained at a final polymerization ratio of 95% by a method similar to that for acrylic rubber A, except that the amounts were changed to 10.7 kg of ethyl acrylate, 500 g of n-butyl acrylate, 300 g of monobutyl maleate, and 1.4 g of tert-dodecylmercaptan.

The copolymer composition of this acrylic rubber I was 1.6% by mass of an ethylene monomer unit, 1.6% by mass of a monobutyl maleate monomer unit, 91.7% by mass of an ethyl acrylate monomer unit, and 5.1% by mass of an n-butyl acrylate monomer unit. Furthermore, the number average molecular weight Mn was 210,000, and the molecular weight distribution Mw/Mn was 3.8.

<Acrylic Rubber J>

Acrylic rubber J was obtained at a final polymerization ratio of 95% by a method similar to that for acrylic rubber A, except that the amounts were changed to 4.4 kg of ethyl acrylate, 6.8 kg of n-butyl acrylate, 300 g of monobutyl maleate, and 1.4 g of tert-dodecylmercaptan.

The copolymer composition of this acrylic rubber J was 1.7% by mass of an ethylene monomer unit, 1.6% by mass of a monobutyl maleate monomer unit, 37.6% by mass of an ethyl acrylate monomer unit, and 59.1% by mass of an n-butyl acrylate monomer unit. Furthermore, the number average molecular weight Mn was 210,000, and the molecular weight distribution Mw/Mn was 3.6.

<Acrylic Rubber K>

Acrylic rubber K was obtained at a final polymerization ratio of 95% by a method similar to that for acrylic rubber A, except that polymerization was initiated without using monobutyl maleate.

The copolymer composition of this acrylic rubber K was 2.2% by mass of an ethylene monomer unit, 53.6% by mass of an ethyl acrylate monomer unit, 34.3% by mass of an n-butyl acrylate monomer unit, and 9.9% by mass of a methyl methacrylate monomer unit. Furthermore, the number average molecular weight Mn was 340,000, and the molecular weight distribution Mw/Mn was 3.8.

<Acrylic Rubber L>

Acrylic rubber L was obtained at a final polymerization ratio of 95% by a method similar to that for acrylic rubber A, except that the amount of monobutyl maleate was changed to 3.0 kg.

The copolymer composition of this acrylic rubber L was 1.9% by mass of an ethylene monomer unit, 15.3% by mass of a monobutyl maleate monomer unit, 47.2% by mass of an ethyl acrylate monomer unit, 26.5% by mass of an n-butyl acrylate monomer unit, and 9.1% by mass of a methyl methacrylate monomer unit. Furthermore, the number average molecular weight Mn was 290,000, and the molecular weight distribution Mw/Mn was 3.6.

<Acrylic Rubber M>

Acrylic rubber M was obtained at a final polymerization ratio of 95% by a method similar to that for acrylic rubber A, except that polymerization was initiated in a state in which 30% by mass of the monomer mixed liquid had all been introduced into the reaction vessel in advance.

The copolymer composition of this acrylic rubber M was 2.1% by mass of an ethylene monomer unit, 1.6% by mass of a monobutyl maleate monomer unit, 53.1% by mass of an ethyl acrylate monomer unit, 33.5% by mass of an n-butyl acrylate monomer unit, and 9.7% by mass of a methyl methacrylate monomer unit. Furthermore, the number average molecular weight Mn was 350,000, and the molecular weight distribution Mw/Mn was 4.1.

<Acrylic Rubber N>

Acrylic rubber N was obtained at a final polymerization ratio of 95% by a method similar to that for acrylic rubber A, except that polymerization was initiated in a state in which the polymerization temperature was set to 10° C.

The copolymer composition of this acrylic rubber N was 2.5% by mass of an ethylene monomer unit, 1.6% by mass of a monobutyl maleate monomer unit, 52.8% by mass of an ethyl acrylate monomer unit, 33.4% by mass of an n-butyl acrylate monomer unit, and 9.7% by mass of a methyl methacrylate monomer unit. Furthermore, the number average molecular weight Mn was 380,000, and the molecular weight distribution Mw/Mn was 2.9.

<Acrylic Rubber O>

Acrylic rubber O was obtained at a final polymerization ratio of 95% by a method similar to that for acrylic rubber A, except that polymerization was initiated in a state in which the polymerization temperature was set to 80° C.

The copolymer composition of this acrylic rubber N was 1.8% by mass of an ethylene monomer unit, 1.6% by mass of a monobutyl maleate monomer unit, 53.1% by mass of an ethyl acrylate monomer unit, 33.6% by mass of an n-butyl acrylate monomer unit, and 9.9% by mass of a methyl methacrylate monomer unit. Furthermore, the number average molecular weight Mn was 330,000, and the molecular weight distribution Mw/Mn was 4.1.

<Testing Methods for Physical Properties>

The toluene-insoluble content and the die swell of acrylic rubbers A to O were evaluated under the following conditions, and the measurement results are presented in Table 2.

(1) Toluene-Insoluble Content 1 g (a) of a sample was precisely weighed and dissolved in 100 ml of toluene at a temperature of 25° C. for 48 hours, subsequently the dissolved liquid was transferred into a centrifuge tube having a capacity of 250 ml, the mass (b) of which had been measured in advance, the dissolved liquid was centrifuged using an angle rotor having a maximum centrifugal radius of 13.8 cm at a temperature of 10° C. or lower and at 8,500 rpm for 60 minutes, a non-sediment was removed by decantation, the residue was dried for 24 hours in a vacuum dryer at a temperature of 70° C., the mass (d) of the centrifuge tube after drying was measured, and the toluene-insoluble content was calculated by the following formula.

$$\text{Toluene-insoluble content (\%)} = (d-b)/a \times 100$$

(2) Die Swell

The die swell was determined by the following formula by extruding an acrylic rubber into a strand form using Capillograph Type 1D (manufactured by TOYO SEIKI Co., Ltd.) in a room temperature environment (25° C.±2° C.) at a barrel temperature of 150° C., a barrel diameter of 9.55 mm, capillary length: L=40 mm and capillary diameter: D1=1 mm (L/D=40), and a piston descending speed of 500 mm/min (shear rate 6,080 s$^{-1}$).

$$\text{Die swell (\%)} = (W/(l\rho S_0) - 1) \times 100$$

provided that W and I represent the mass (g) and length (cm) of the sample, respectively; $\rho$ represents the specific weight of the acrylic rubber; and $S_0$ represents the area (cm$^2$) of the die.

TABLE 2

|  |  | Example | | | | | | Comparative Example | | | | | | | | |
|---|---|---|---|---|---|---|---|---|---|---|---|---|---|---|---|---|
|  |  | 1 | 2 | 3 | 4 | 5 | 6 | 1 | 2 | 3 | 4 | 5 | 6 | 7 | 8 | 9 |
| Acrylic rubber |  | A | B | C | D | E | F | G | H | I | J | K | L | M | N | O |
| Toluene-insoluble content | % | 2.3 | 2.7 | 4.9 | 0.8 | 1.2 | 14.2 | 21.3 | 31.2 | 13.4 | 11.8 | 1.9 | 5.3 | 17.2 | 0.5 | 19.5 |
| Die swell | % | 1.41 | 1.29 | 1.43 | 1.73 | 1.38 | 1.71 | 2.30 | 2.72 | 1.66 | 1.61 | 1.30 | 1.53 | 1.89 | 2.12 | 2.17 |

<Production of Acrylic Rubber Composition>

The acrylic rubbers obtained by the above-described methods were kneaded at the compositions in Table 3 for 15 minutes in a 0.5-L pressurized type kneader and then were kneaded for 20 minutes using a 6-inch open roll.

TABLE 3

|  |  |  |  | Example | | | | | | |
|---|---|---|---|---|---|---|---|---|---|---|
|  |  |  |  | 7 | 8 | 9 | 10 | 11 | 12 | 13 |
|  |  | Acrylic rubber |  | A | A | A | A | A | A | A |
| Blend (parts by weight) |  | Acrylic rubber |  | 100 | 100 | 100 | 100 | 100 | 100 | 100 |
|  |  | Acetylene black granular product |  | 50 | 60 | — | — | — | — | — |
|  |  | Acetylene black FX-35 |  | — | — | 40 | 50 | — | — | — |
|  |  | Acetylene black HS-100 |  | — | — | — | — | 55 | 65 | — |
|  |  | FEF carbon black |  | — | — | — | — | — | — | 55 |
|  |  | Stearic acid |  | 1 | 1 | 1 | 1 | 1 | 1 | 1 |
|  |  | Aging inhibitor |  | 2 | 2 | 2 | 2 | 2 | 2 | 2 |
|  |  | Liquid paraffin |  | 1 | 1 | 1 | 1 | 1 | 1 | 1 |
|  |  | Stearylamine |  | 0.3 | 0.3 | 0.3 | 0.3 | 0.3 | 0.3 | 0.3 |
|  |  | Diak#1 |  | 0.4 | 0.4 | 0.4 | 0.4 | 0.4 | 0.4 | 0.4 |
|  |  | XLA-60 |  | 0.8 | 0.8 | 0.8 | 0.8 | 0.8 | 0.8 | 0.8 |
| Properties evaluation | Extrudability | Extrusion length | cm/min | 96.5 | 102.0 | 89.4 | 94.8 | 79.2 | 85.1 | 78.2 |
|  |  | Die swell | % | 1.40 | 1.37 | 1.46 | 1.41 | 1.54 | 1.49 | 1.56 |
|  | Vulcanization characteristic | Tensile strength | MPa | 10.3 | 10.1 | 12.7 | 11.9 | 7.6 | 7.9 | 9.9 |
|  |  | Elongation at break | % | 515 | 455 | 511 | 452 | 467 | 415 | 389 |
|  |  | Hardness |  | 61 | 70 | 62 | 71 | 61 | 69 | 62 |
|  | Heat resistance | Tensile strength | MPa | 3.7 | 4.1 | 3.5 | 5.2 | 2.3 | 2.5 | 2.7 |
|  |  | Elongation at break | % | 208 | 173 | 201 | 167 | 147 | 115 | 142 |
|  |  | Hardness change |  | +23 | +25 | +24 | +25 | +28 | +29 | +25 |
|  |  | Bending fatigability |  | A | A | A | A | A | A | A |

|  |  |  |  | Example | | | | | | |
|---|---|---|---|---|---|---|---|---|---|---|
|  |  |  |  | 14 | 15 | 16 | 17 | 18 | 19 | 20 |
|  |  | Acrylic rubber |  | A | B | C | D | E | F | F |
| Blend (parts by weight) |  | Acrylic rubber |  | 100 | 100 | 100 | 100 | 100 | 100 | 100 |
|  |  | Acetylene black granular product |  | — | — | — | — | — | — | — |
|  |  | Acetylene black FX-35 |  | — | — | — | — | — | — | — |
|  |  | Acetylene black HS-100 |  | — | — | — | — | — | — | — |
|  |  | FEF carbon black |  | 65 | — | — | — | — | — | 55 |
|  |  | Stearic acid |  | 1 | 1 | 1 | 1 | 1 | 1 | 1 |
|  |  | Aging inhibitor |  | 2 | 2 | 2 | 2 | 2 | 2 | 2 |
|  |  | Liquid paraffin |  | 1 | 1 | 1 | 1 | 1 | 1 | 1 |
|  |  | Stearylamine |  | 0.3 | 0.3 | 0.3 | 0.3 | 0.3 | 0.3 | 0.3 |
|  |  | Diak#1 |  | 0.4 | 0.4 | 0.4 | 0.4 | 0.4 | 0.4 | 0.4 |
|  |  | XLA-60 |  | 0.8 | 0.8 | 0.8 | 0.8 | 0.8 | 0.8 | 0.8 |
| Properties evaluation | Extrudability | Extrusion length | cm/min | 82.9 | 97.1 | 94.5 | 93.2 | 105.6 | 81.2 | 73.1 |
|  |  | Die swell | % | 1.51 | 1.39 | 1.43 | 1.44 | 1.35 | 1.59 | 1.65 |
|  | Vulcanization characteristic | Tensile strength | MPa | 10.2 | 9.4 | 9.8 | 11.2 | 11.7 | 13.4 | 13.1 |
|  |  | Elongation at break | % | 324 | 534 | 467 | 497 | 416 | 369 | 357 |
|  |  | Hardness |  | 71 | 60 | 62 | 60 | 61 | 61 | 63 |
|  | Heat resistance | Tensile strength | MPa | 2.9 | 3.4 | 3.8 | 4.0 | 3.2 | 6.9 | 5.7 |
|  |  | Elongation at break | % | 106 | 184 | 179 | 197 | 134 | 135 | 105 |
|  |  | Hardness change |  | +27 | +25 | +24 | +24 | +26 | +23 | +24 |
|  |  | Bending fatigability |  | B | A | A | A | A | B | B |

TABLE 3-continued

| | | | | Comparative Example | | | | | | | | |
|---|---|---|---|---|---|---|---|---|---|---|---|---|
| | | | | 10 | 11 | 12 | 13 | 14 | 15 | 16 | 17 | 18 |
| | Acrylic rubber | | | G | H | I | J | K | L | M | N | O |
| Blend (parts by weight) | | Acrylic rubber | | 100 | 100 | 100 | 100 | 100 | 100 | 100 | 100 | 100 |
| | | Acetylene black granular product | | — | — | — | — | — | — | — | — | — |
| | | Acetylene black FX-35 | | — | — | — | — | — | — | — | — | — |
| | | Acetylene black HS-100 | | — | — | — | — | — | — | — | — | — |
| | | FEF carbon black | | — | — | — | — | — | — | — | — | — |
| | | Stearic acid | | 1 | 1 | 1 | 1 | 1 | 1 | 1 | 1 | 1 |
| | | Aging inhibitor | | 2 | 2 | 2 | 2 | 2 | 2 | 2 | 2 | 2 |
| | | Liquid paraffin | | 1 | 1 | 1 | 1 | 1 | 1 | 1 | 1 | 1 |
| | | Stearylamine | | 0.3 | 0.3 | 0.3 | 0.3 | 0.3 | 0.3 | 0.3 | 0.3 | 0.3 |
| | | Diak#1 | | 0.4 | 0.4 | 0.4 | 0.4 | 0.4 | 0.4 | 0.4 | 0.4 | 0.4 |
| | | XLA-60 | | 0.8 | 0.8 | 0.8 | 0.8 | 0.8 | 0.8 | 0.8 | 0.8 | 0.8 |
| Properties evaluation | Extrudability | Extrusion length | cm/min | 74.2 | 64.7 | 68.9 | 85.2 | Not vulcanized | 80.1 | 88.7 | 77.9 | 76.4 |
| | | Die swell | % | 1.58 | 1.73 | 1.68 | 1.56 | | 1.60 | 1.46 | 1.53 | 1.38 |
| | Vulcanization characteristic | Tensile strength | MPa | 8.4 | 12.1 | 13.8 | 8.7 | | 14.8 | 9.6 | 10.9 | 8.9 |
| | | Elongation at break | % | 567 | 402 | 345 | 321 | | 498 | 498 | 497 | 498 |
| | | Hardness | | 59 | 59 | 60 | 59 | | 62 | 60 | 60 | 60 |
| | Heat resistance | Tensile strength | MPa | 1.8 | 3.2 | 7.3 | 4.2 | | 5.4 | 3.2 | 3.9 | 2.8 |
| | | Elongation at break | % | 148 | 41 | 102 | 76 | | 23 | 162 | 179 | 187 |
| | | Hardness change | | +29 | +28 | +26 | +26 | | +27 | +25 | +24 | +23 |
| | | Bending fatigability | | C | C | C | B | | C | C | A | C |

<Production of Vulcanizate of Acrylic Rubber Composition>

Each of the acrylic rubber compositions thus obtained was subjected to sheeting into a sheet having a thickness of 2.4 mm, was subsequently subjected to primary vulcanization for 40 minutes at 170° C. with a press vulcanizer, and was subsequently subjected to secondary vulcanization in a gear oven for 4 hours at 170° C., and thereby a vulcanizate was produced.

<Testing Methods for Physical Properties>

The extrudability of the acrylic rubber compositions thus obtained, and the tensile strength and elongation at break, hardness, heat resistance test, and bending fatigability of the vulcanizates of the acrylic rubber compositions were evaluated under the following conditions, and the measurement results are presented in Table 3.

(1) Extrudability

An acrylic rubber composition was molded into a tube form (inner diameter: 9 mm, outer diameter: 14 mm) using a rubber single-screw extruder (screw diameter: 50 mm), and thereby the tube extrusion length in the vertical direction and the die swell were measured. The die swell was measured by the same method as described above.

(2) Tensile Strength and Elongation at Break

Measured according to JIS K6251-2010.

(3) Hardness

Measured according to JIS K6253-3 using a type A durometer.

(4) Heat Resistance Test

The tensile strength and elongation at break of a vulcanizate of an acrylic rubber composition and the hardness change after a heat treatment was carried out for a test time of 504 hours at a test temperature of 190° C. according to JIS K6257-2010 were measured.

(5) Hardness Change

Measured according to JIS K6253-3 using a type A durometer.

(6) Bending Fatigability (Flex Cracking Generation Test)

Measured according to JIS-K6260:2010. Regarding the acrylic rubber, a product obtained by performing kneading at the composition of Table 1 using a 0.5-L pressurized type kneader and a 6-inch open roll, sheeting into a sheet having a thickness of 2.4 mm, and then performing press vulcanization for 40 minutes at 170° C. with a press vulcanizer and subsequently secondary vulcanization in a gear oven for 4 hours at 170° C., was used.

The evaluation of the bending fatigability was evaluated according to the following.

A: 2,000,000 times or more

B: 1,500,000 times or more and fewer than 2,000,000 times

C: Fewer than 1,500,000 times

As shown in Tables 2 and 3, the acrylic rubbers of the present invention exhibited excellent extrudability (die swell), and vulcanizates of acrylic rubber compositions obtainable by vulcanizing these acrylic rubbers exhibited excellent mechanical properties, heat resistance, and bending fatigability.

The invention claimed is:

1. An acrylic rubber produced by a method comprising dividedly adding 80% to 100% by mass of the total mass of a monomer component containing 100 parts by mass of an acrylic acid alkyl ester having an alkyl group having 1 to 3 carbon atoms, 20 to 160 parts by mass of an acrylic acid alkyl ester having an alkyl group having 4 to 8 carbon atoms, 0.1 to 5 parts by mass of ethylene, and 0.1 to 10 parts by mass of a crosslinking seat monomer containing a carboxyl group, and performing emulsion polymerization at a polymerization temperature of 20° C. to 60° C., the acrylic rubber having a die swell of 1.3 to 1.9 at a shear rate at 150° C. of 6,080 s$^{-1}$, a number average molecular weight (Mn) of 100,000 to 400,000, a molecular weight distribution (Mw/Mn) of 2.5 to 4, and a toluene-insoluble content of 10% or less.

2. An acrylic rubber containing, as monomer units, 100 parts by mass of an acrylic acid alkyl ester having an alkyl group having 1 to 3 carbon atoms, 20 to 160 parts by mass of an acrylic acid alkyl ester having an alkyl group having 4 to 8 carbon atoms, 0.1 to 5 parts by mass of ethylene as a monomer unit, and 0.1 to 10 parts by mass of a crosslinking seat monomer containing a carboxyl group, the acrylic rubber having a die swell of 1.3 to 1.9 at a shear rate at 150° C. of 6,080 s$^{-1}$, a number average molecular weight (Mn) of 100,000 to 400,000, a molecular weight distribution (Mw/Mn) of 2.5 to 4, and a toluene-insoluble content of 10% or less.

3. The acrylic rubber according to claim 2, further containing 10 to 50 parts by mass of a methacrylic acid alkyl ester having an alkyl group having 1 to 4 carbon atoms as a monomer unit.

4. An acrylic rubber composition including 100 parts by mass of the acrylic rubber according to claim 1 and 30 to 80 parts by mass of carbon black.

5. The acrylic rubber composition according to claim 4, wherein the carbon black has an arithmetic mean particle size of 25 to 40 nm, a dibutyl phthalate (DBP) oil absorption of 150 to 240 ml/100 g, a ratio ($N_2SA/IA$) of the nitrogen adsorption specific surface area ($N_2SA$) and the iodine adsorption (IA) of 0.6 to 0.9, and an average stacking height in the C-axis direction (Lc) of the layer plane in a crystallite of 2 nm or more.

6. The acrylic rubber composition according to claim 4, wherein the carbon black is acetylene black.

7. A vulcanizate of the acrylic rubber composition according to claim 4.

8. The vulcanizate according to claim 7, wherein the tensile force after heating for 500 hours at 190° C. is 2.0 to 7.0 MPa, and the elongation at break is 100% to 210%.

9. The vulcanizate according to claim 7, wherein in a flex cracking generation test measured according to JIS-K6260: 2010, after the vulcanizate is subjected to a bending operation for 1,500,000 times, no cracks and fissures are recognized in the external appearance.

10. A method for producing the vulcanizate according to claim 7, the method comprising: a primary vulcanization step of performing steam vulcanization or press vulcanization for 1 to 10 hours at 100° C. to 200° C.; and a secondary vulcanization step of subjecting the vulcanizate obtained in the primary vulcanization step to hot air vulcanization for 1 to 10 hours at 100° C. to 200° C.

11. A rubber hose comprising the vulcanizate according to claim 7.

12. A seal part comprising the vulcanizate according to claim 7.

* * * * *